United States Patent [19]

Adams

[11] Patent Number: 5,758,702
[45] Date of Patent: Jun. 2, 1998

[54] ROUTER SAW AND GUIDE

[76] Inventor: George H. Adams, 10218 Portland Ave. South, Bloomington, Minn. 55420

[21] Appl. No.: 692,872

[22] Filed: Aug. 2, 1996

[51] Int. Cl.⁶ ..................................................... B27C 5/10
[52] U.S. Cl. ............................... 144/136.95; 144/154.5; 144/371
[58] Field of Search ................... 144/134.1, 136.1, 144/137, 136.95, 154.5, 371; 409/180, 181, 182

[56] References Cited

U.S. PATENT DOCUMENTS

| | | | |
|---|---|---|---|
| 3,170,373 | 2/1965 | Crepean et al. | 409/182 |
| 4,312,391 | 1/1982 | Snow . | |
| 4,921,023 | 5/1990 | Pempek | 409/182 |
| 4,977,938 | 12/1990 | Greeson | 409/182 |
| 4,993,897 | 2/1991 | Anderhalden | 409/180 |
| 5,062,460 | 11/1991 | Deline | 144/154.5 |
| 5,139,065 | 8/1992 | Stark . | |
| 5,249,614 | 10/1993 | Osborn | 409/182 |
| 5,265,657 | 11/1993 | Matsumoto et al. | 409/182 |
| 5,345,986 | 9/1994 | Kieffer . | |
| 5,452,751 | 9/1995 | Engler, III et al. . | |

OTHER PUBLICATIONS

Porter Cable catalog (date unkown), p. 79.
Woodworker's Supply catalog, Feb. 1996, p. 29.

*Primary Examiner*—W. Donald Bray
*Attorney, Agent, or Firm*—James W. Miller

[57] ABSTRACT

A kit for converting a standard router into a saw comprises a rectangular base plate having a through hole in one side thereof. The router may be mounted on the base plate above the hole and when so mounted preferably has one of its handles sticking out over an adjacent transverse edge of the base plate. A D-handle is fixed on the base plate extending perpendicular relative to the transverse edge and parallel to a longitudinal edge of the base plate. The D-handle is not directly connected to the router but is simply affixed to the base plate adjacent the router. The D-handle can be gripped by one hand of the user, and the router handle that sticks out over the transverse edge of the base plate can be gripped by the other hand of the user, and the combined structure can be pushed much like a circular saw with the revolving cutter of the router making an elongated saw cut. Either longitudinal edge of the base plate functions as a guide edge that can be abutted against a fixed guide surface during a sawing operation.

20 Claims, 1 Drawing Sheet

5,758,702

1

ROUTER SAW AND GUIDE

TECHNICAL FIELD

This invention relates to a kit for converting a standard router into an effective hand-held saw and to the router saw that is the result of the conversion.

BACKGROUND OF THE INVENTION

Routers are well known tools having a revolving vertical cutter for milling out the surface of wood or metal. They are commonly used in woodworking for routing or cutting dadoes, rabbets, and grooves used in joints or for decorative purposes. A standard router typically includes a cylindrical, vertically extending motor housing, a base ring that engages the work and is secured to the lower end of the motor housing with the cutter extending down from the motor housing through the open center of the base ring, and a plurality of guide handles attached to the base ring or the motor housing for manipulating the router. The motor housing encloses an electrical motor for rotating the cutter at high speed. An electrical cord extends from the motor and has a plug on the end for plugging the router into any suitable electrical power source.

While routers are well suited for the milling operations for which they were designed, they are not typically used for sawing through wood and making longitudinal saw cuts. Instead, another portable, hand held tool known as a circular saw is often used for this purpose. A typical circular saw has a motor housing with a horizontally mounted motor having a horizontal drive shaft that rotatably mounts a circular saw blade having saw teeth around its periphery. The saw includes a rectangular base plate having an opening through which the lower portion of the saw blade extends. A handle having a hand grip space is provided on one side of the motor housing, and a small T-shaped handle may be provided on the other side of the motor housing, so that the circular saw is held and guided by the user with both hands. The base plate has straight edges parallel to the saw blade to allow the base plate to engage against a guide surface to make a straight cut.

While circular saws are effective in making longitudinal saw cuts, they have difficulty in cleanly sawing through some materials. For example, in attempting to saw through various kinds of plastic laminates, such as the plastic laminates often used in kitchen counter tops, the teeth of the circular saw blade often rip or shred the material along the length of the saw cut. This is true even when one attempts to use a circular saw blade with fine teeth. Accordingly, the carpenter has to cut through these kinds of materials using some other kind of cutting implement, such as a hand operated saw, which greatly increases the time and effort required to make the cut. Accordingly, the relative ineffectiveness of a circular saw when cutting these kinds of materials is a disadvantage of this type of tool.

The applicant has discovered that a router can effectively be used to make saw cuts through the kinds of materials that a circular saw has difficulty with, such as through plastic laminates. However, the standard router lacks a rectangular base plate with straight guide edges, and the handles typically provided on a router do not allow the router to be easily pushed in the manner of a saw. Thus, there is a need in the art for some type of means for converting a standard router into an effective hand held saw.

SUMMARY OF THIS INVENTION

One aspect of this invention is to provide a kit that can convert a standard router into an effective hand held saw, and to the router saw that is the result of the conversion.

These and other aspects of this invention are provided by a base plate having at least one straight guide edge. A hole on the base plate extends through the base plate such that the router can be mounted on the base plate above the hole with the cutter extending through the hole. A D-handle is carried on the base plate parallel to the guide edge of the base plate such that the D-handle can be used to push the base plate with the guide edge being abutted against a fixed guide surface to enable use of the router in the manner of a saw. The invention can be provided in a kit form, i.e. comprising just the base plate and D-handle, or as a complete router saw in which the router is affixed to the base plate.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
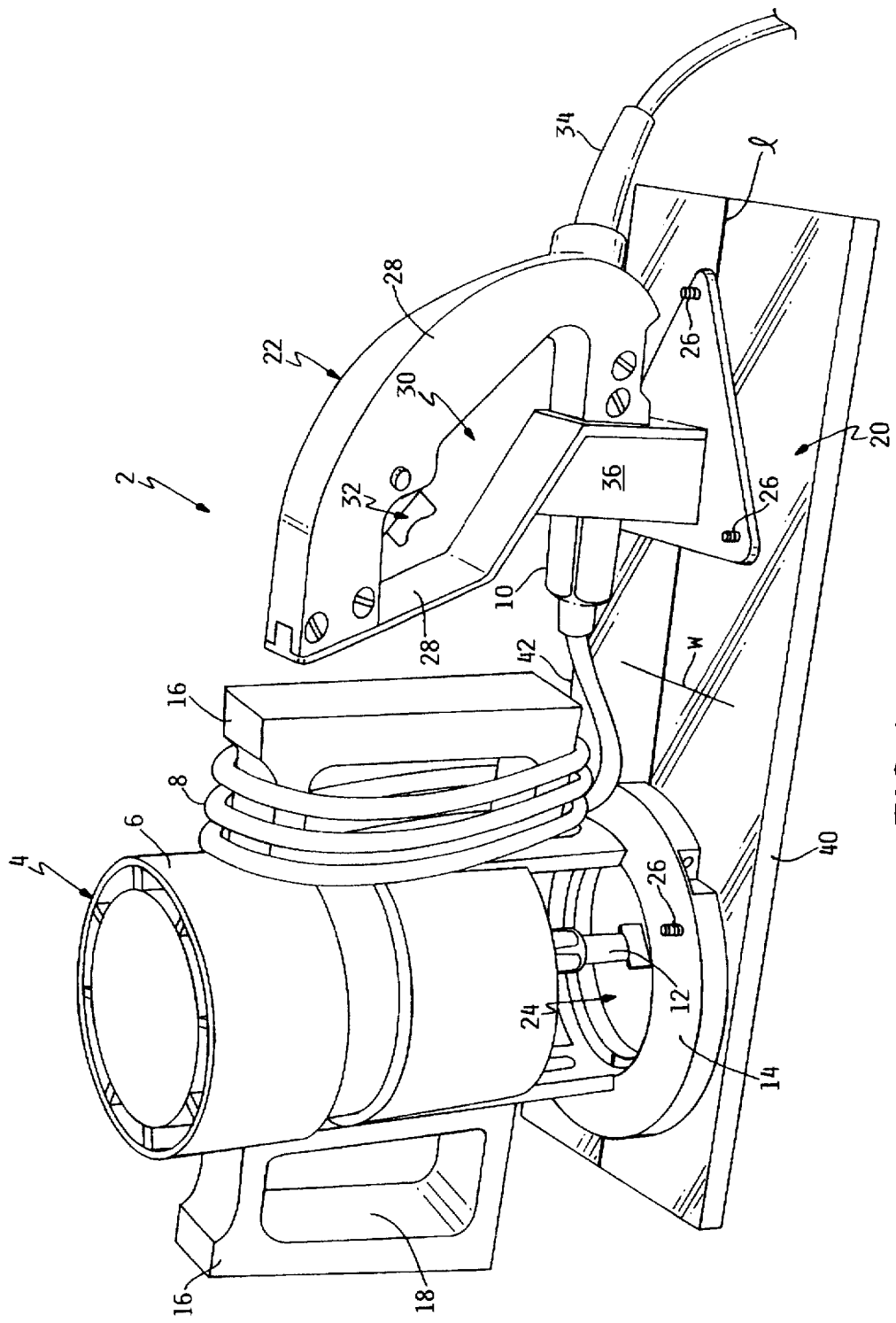
FIG. 1 is a perspective view of a standard router that has been converted into a saw using the base plate/D-handle kit of this invention.

This invention comprises a means or kit, generally indicated as 2, for converting a standard router 4 to a portable, hand held saw. Router 4 includes a vertically extending motor housing 6 that encloses a vertically oriented electrical motor (not shown). An electrical cord 8 having a plug 10 is provided on router 4 for supplying electricity to the router motor. A vertically extending cutter 12 is formed by a revolving bit.

Cutter 12 of router 4 extends vertically down through the open central area of a base ring 14. The height of cutter 12 can be adjusted upwardly and downwardly by a height adjusting mechanism (not shown). Two outwardly extending handles 16 are provided on router 4, one on either side of motor housing 6, having hand grips 18. Handles 16 are aligned with one another to extend along the same general axis.

Router 4 described thus far is meant to represent any typical standard router of the type that is widely sold and used in this country. Most routers 4 will have the elements described above, though the shape and orientation of router handles 16 might change. Some routers 4 have knob type handles instead of handles 16 having enclosed hand grips 18 as depicted in FIG. 1. In some routers 4, handles 16 might be joined to router 4 at or near base ring 14, rather than on motor housing 6. In any event, this invention is meant to be used with any standard router of the type generally described herein despite differences in the handle shape or handle point of attachment or other differences not specifically described herein.

The means of this invention for converting router 4 into a saw comprises a kit 2 having a base plate 20 for mounting router 4 and a D-handle 22 attached to base plate 20. Base plate 20 is preferably rectangular having a longitudinal axis 1 and a transverse axis w. Accordingly, the longitudinal edges 40 and 42 of base plate 20 each form guide edges which are straight and which are suited to be abutted against a fixed guide surface or guide rail during a sawing operation. Base plate 20 is preferably about 16 inches long along longitudinal axis 1 and about 6 inches wide along transverse axis w.

Base plate 20 may be made of any suitably rigid, planar material. For example, base plate 20 may be made of a relatively thick, transparent sheet of plastic material. Alternatively, base plate 20 may be made of other materials and may be non-transparent as well.

A circular hole 24 is provided on one side of base plate 20, i.e. a hole 24 set to one side of transverse axis w. Hole 24 is also preferably centered on longitudinal axis 1 of base plate 20. Base plate 24 is preferably symmetrical about both longitudinal axis 1 and transverse axis w. In any event, hole 24 extends through the entire thickness of base plate 20 and allows cutter 12 of router 4 to extend down through hole 24. Router 4 is mounted on base plate 20 above hole 24 using any suitable attachment means, e.g. by using a plurality of bolts or screws 26 extending upwardly through base plate 20 into various threaded attachment apertures that are normally already present in base ring 14 of router 4. Once so secured, router 4 is fixed to base plate 20 on one side thereof.

Preferably, router 4 is mounted to base plate 20 such that handles 16 thereon extend along longitudinal axis 1 of base plate 20. In addition, hole 24 is located on base plate 20 sufficiently close to one end of base plate 20 so that one router handle 16 extends slightly outwardly from the adjacent transverse edge of base plate 20. This outwardly extending handle on router 4 effectively becomes the front guide handle that can be gripped by the user when router 4 is operated as a saw. Preferably, the width of base plate 20 is approximately as wide as the diameter of base ring 14 of router 4 so that the longitudinal guide edges 40 and 42 provided by base plate 20 are only slightly outboard from router 4.

A generally conventional D-handle 22 is fixedly mounted to base plate 20 by attachment bolts or screws 26 on the other side of base plate 20, i.e. set to the other side of the transverse axis w opposite to the side on which router 4 is mounted. The term D-handle refers to the shape of D-handle 22 with handle 22 having exterior, peripheral members 28 in a D-shape forming an enclosed hand grip space 30. A finger operated trigger switch 32 extends into hand grip space 30 with the user pulling or pushing inwardly on trigger 32 to actuate trigger 32. D-handle 22 includes its own electrical cord 34 that may be plugged into an electrical outlet (not shown) as well as a socket 36 into which cord 8 of router 4 may be plugged. When so connected, electrical power is fed into router 4 through cord 34 and socket 36 of D-handle 22, with trigger 32 mounted in D-handle 22 effectively becoming the on/off control for router 4.

D-handle 22 is preferably mounted in line with longitudinal axis 1 of base plate 20 and in line with handles 16 of router 4. Thus, when router 4 is mounted to base plate 20 having D-handle 22, the user can grip and use router 4 much like a hand held circular saw. In other words, the user can grip D-handle 22 with one hand and place his or her other hand on the outwardly extending router handle 16 that sticks out over the transverse edge of base plate 20. Then, while depressing trigger 32, the user can abut either one of the longitudinal guide edges 40 or 42 of base plate 20 against a fixed guide surface and push forwardly while keeping guide edges 40 or 42 against the guide surface. As cutter 12 of router 4 rotates about its vertical axis, it will cut a straight line through the underlying materials as base plate 20 is pushed forwardly using D-handle 22. Accordingly, the operator can easily control and guide the movement of router 4 much in the same manner as a circular saw can be moved and guided.

When a standard router 4 is converted into a saw using kit 2 of this invention, it can smoothly and evenly cut various materials, such as plastic laminates, that circular saws tend to rip or shred. Accordingly, it allows the user to quickly cut through such materials using a power operated tool without the time and effort required in using hand operated tools.

Base plate 20 of kit 2 is preferably about as wide as the diameter of base ring 14 of router 4, and only slightly longer than the combined lengths of router 4 and D-handle 22 when they are mounted side-by-side and in line with one another as shown in FIG. 1. Thus, router 4 can be picked up and easily manipulated in the manner of a saw. If base plate 20 were substantially longer and wider than as shown in the drawings, it would be more difficult to pick up and use router 4 as a saw, though obviously the dimensions of base plate 20 can vary.

Router 4, base plate 20 and D-handle 22 can be sold preassembled as a complete router saw with router 4 and D-handle 22 already attached to base plate 20. Or, the components could all be sold in an unassembled form with the user having to mount router 4 and D-handle 22 to base plate 20. Alternatively, assuming the user already has a router 4 or purchases one separately, just base plate 20 and D-handle 22 could be sold as a kit for converting router 4 to a saw, with D-handle 22 being preassembled to base plate 20 or being unassembled. This invention is meant to cover all of these various possible forms as to how the components might be packaged and sold.

Preferably, the longitudinal centerline 1 is marked with a visible groove or line on the top surface of base plate 20 representing the line of cut to be made by router 4. This helps the user orient the base plate 20 by letting him place the visible groove or line along a desired line of cut at each of the transverse edges of the base plate 20. The user can then slide the guide surface or guide rail up against one of the longitudinal edges 40 or 42 and clamp that guide surface or guide rail in place. Thereafter, the cut can be made simply by keeping the base plate 20 up against the guide surface or guide rail.

Another advantage of being able to use a router 4 as a saw is that it will safer than using a circular saw. The user will be less likely to injure himself.

Various modifications of this invention will be apparent to those skilled in the art. For example, while a rectangular base plate is preferred, base plate 20 could have other shapes as long as there is at least one straight guide edge preferably parallel to D-handle 22. While hole 24 is located on base plate 20 such that one handle of router 4 sticks out over the adjacent transverse edge of base plate 20, hole 24 could be set further inboard so that the handle 16 remains inboard of the edge after router 4 is mounted on base plate 20. Accordingly, this invention is to be limited only by the appended claims.

I claim:

1. A kit for converting a router having a vertically revolving cutter into a saw, which comprises:
   (a) a base plate having at least one straight guide edge and a substantially flat lower surface to permit the base plate to lie flat on a piece of material to be cut;
   (b) a hole on the base plate extending through the base plate such that the router can be mounted on the base plate above the hole with the cutter extending through the hole; and
   (c) a D-handle carried on the base plate parallel to the guide edge of the base plate such that the D-handle can be used to push the base plate with the guide edge being abutted against a fixed surface to enable use of the router in the manner of a saw, and wherein the D-handle forms a hand grip space that is oriented generally vertically such that the user's hand is substantially upright and faces the router when the user grips the hand grip space of the D-handle to allow the user to effectively push the base plate, and thus the router when the router is attached to the base plate, forwardly in the manner of a saw.

2. The kit of claim 1, wherein the base plate has a longitudinal axis and a transverse axis, and wherein the guide edge of the base plate and the D-handle are both parallel to the longitudinal axis of the base plate.

3. The kit of claim 2, wherein the base plate is rectangular having two longitudinal edges parallel to the longitudinal axis of the base plate and two transverse edges parallel to the transverse axis of the base plate.

4. The kit of claim 3, wherein the base plate is symmetrical about the longitudinal axis of the base plate.

5. The kit of claim 4, wherein the hole is centered on the longitudinal axis of the base plate.

6. The kit of claim 1, wherein the hole is carried on one side of the base plate and the D-handle is carried on the other side of the base plate.

7. The kit of claim 6, wherein the D-handle is fixed to the base plate.

8. The kit of claim 1, wherein the D-handle is fixed to the base plate.

9. The kit of claim 1, wherein the D-handle includes an electrical cord for carrying electrical power thereto, an electrical socket for receiving an electrical plug, and a switch for turning power on and off to the socket.

10. The kit of claim 9, wherein the router includes an electrical cord having a plug which plug may be plugged into the socket of the D-handle.

11. The kit of claim 1, wherein the base plate has a width that is approximately as wide as a base ring of the router.

12. The kit of claim 1, wherein the hole is located on one side of the base plate near a transverse edge that connects to the guide edge but is separate from the guide edge, and wherein the hole is located close enough to the transverse guide edge so that one handle of the router extends over the transverse guide edge of the base plate when the router is connected to the base plate.

13. A router saw, which comprises:

(a) a base plate having at least one straight peripheral guide edge and a substantially flat lower surface to permit the base plate to lie flat on a piece of material to be cut;

(b) a router having a vertically revolving cutter, wherein the router is secured to the base plate with the router cutter extending downwardly through the base plate to contact an underlying work piece; and (c) a D-handle secured to the base plate for pushing the base plate with the guide edge being abutted against a fixed guide surface to allow the router to function as a saw, and wherein the D-handle forms a hand grip space that is oriented generally vertically such that the user's hand is substantially upright and faces the router when the user grips the hand grip space of the D-handle to allow the user to effectively push the base plate and thus the router when the router is attached to the base plate forwardly in the manner of a saw.

14. A router saw, which comprises:

(a) a base plate having a longitudinal axis and a transverse axis, wherein the base plate has a hole located on one side of the base plate to one side of the transverse axis, wherein the base plate includes at least one straight peripheral guide edge that is parallel to the longitudinal axis of the base plate and wherein the base plate has a substantially flat lower surface to permit the base plate to lie flat on a piece of material to be cut;

(b) a router having a vertically revolving cutter secured to the one side of the base plate above the hole with the router cutter extending downwardly through the hole; and (c) a D-handle carried on the other side of the base plate opposite to the side carrying the router with the D-handle being separate from the router and being spaced from the router wherein the D-handle is parallel to the longitudinal axis of the base plate and to the peripheral guide edge, wherein the D-handle has a generally vertical hand grip space that receives the user's hand in a generally upright orientation whereby the user can push the router mounted on the base plate using the D-handle with the guide edge being abutted against a fixed guide surface to allow the router to function as a saw.

15. The router saw of claim 14, wherein the base plate is rectangular having two longitudinal edges parallel to the longitudinal axis of the base plate and two transverse edges parallel to the transverse axis of the base plate, wherein the peripheral guide edge comprises either of the longitudinal edges of the base plate.

16. The router saw of claim 15, wherein the hole is centered on the longitudinal axis of the base plate such that each longitudinal edge of the base plate is equidistant from the hole's center.

17. The router saw of claim 14, wherein the hole is sufficiently close to one of the transverse edges of the base plate such that one handle of the router extends over the transverse edge of the base plate to function as a front handle while the D-handle functions as a rear handle.

18. The router saw of claim 14, wherein the router is electrically operated, and wherein the D-handle includes an electrical cord for plugging into an electrical outlet and an electrical socket into which the router may be plugged.

19. The router saw of claim 18, wherein the D-handle includes a switch for controlling the on/off application of power to the socket on the D-handle, and hence to the router.

20. The router saw of claim 14, wherein the width of the base plate across its transverse axis is approximately the same as the width of a base ring of the router.

* * * * *